(12) United States Patent
Mengel (10) Patent No.: US 11,035,446 B2
(45) Date of Patent: Jun. 15, 2021

(54) LINEAR ACTUATOR

(71) Applicant: LINAK A/S, Nordborg (DK)

(72) Inventor: Asger Mengel, Sønderborg (DK)

(73) Assignee: LINAK A/S, Nordborg (DK)

( * ) Notice: Subject to any disclaimer, the term of this patent is extended or adjusted under 35 U.S.C. 154(b) by 0 days.

(21) Appl. No.: 16/968,377

(22) PCT Filed: Mar. 8, 2019

(86) PCT No.: PCT/DK2019/000090
§ 371 (c)(1),
(2) Date: Aug. 7, 2020

(87) PCT Pub. No.: WO2019/170203
PCT Pub. Date: Sep. 12, 2019

(65) Prior Publication Data
US 2020/0393028 A1    Dec. 17, 2020

(30) Foreign Application Priority Data
Mar. 8, 2018    (DK) ............................ PA 2018 00105

(51) Int. Cl.
*F16H 25/20*     (2006.01)
*A61G 7/018*    (2006.01)
*F16H 25/24*     (2006.01)

(52) U.S. Cl.
CPC ......... *F16H 25/2015* (2013.01); *A61G 7/018* (2013.01); *F16H 25/2454* (2013.01); *F16H 2025/209* (2013.01); *F16H 2025/2071* (2013.01)

(58) Field of Classification Search
CPC ............. F16H 25/2015; F16H 25/2454; F16H 2025/2071; F16H 2025/209; A61G 7/018
See application file for complete search history.

(56) References Cited

U.S. PATENT DOCUMENTS

2007/0157385 A1* 7/2007 Lemire ................ A61G 7/0509
  5/600
2010/0319477 A1* 12/2010 Tateishi ............... H02K 7/1023
  74/411.5

(Continued)

FOREIGN PATENT DOCUMENTS

DE           3842078 A1    7/1989
DE         29612493 U1    10/1996
(Continued)

*Primary Examiner* — David M Fenstermacher
(74) *Attorney, Agent, or Firm* — Dykema Gossett PLLC (57) ABSTRACT

Linear actuator comprising a reversible electric motor (20), a transmission (21), a non-self-locking spindle (22), where the reversible electric motor (20) through the transmission (21) drives the non-self-locking spindle (22) and a spindle nut (23) on the spindle (22). The actuator further comprises an adjustment element (24) secured against rotation and where the adjustment element (24) can be moved axially, as it is connected to or integrated with the spindle nut (23) on the spindle (22). Further, that actuator comprises position means for determining the position of the spindle nut (23), brake means for controlling the speed of the spindle nut (23) under the external load. Between the brake means and the spindle there is a coupling in connection with the position means for determining the position of the spindle nut (23). The coupling engages the brake means to the spindle or disengages the brake means from the spindle, when the spindle nut (23) is in a predetermined position on the spindle (22).

10 Claims, 12 Drawing Sheets

(56) References Cited

U.S. PATENT DOCUMENTS

| | | | | |
|---|---|---|---|---|
| 2016/0140307 A1* | 5/2016 | Brosnan | | G16H 40/67 |
| | | | | 600/324 |
| 2016/0307429 A1* | 10/2016 | Hood | | G16H 40/63 |
| 2018/0334250 A1* | 11/2018 | Klode | | B64C 25/24 |
| 2019/0063568 A1* | 2/2019 | Laskovy | | B64C 13/505 |
| 2019/0107184 A1* | 4/2019 | Matsuto | | H02K 11/0141 |
| 2020/0018259 A1* | 1/2020 | Werquin | | F15B 15/261 |
| 2020/0032741 A1* | 1/2020 | Werquin | | F16H 25/20 |
| 2020/0103009 A1* | 4/2020 | Borgarelli | | H02K 11/30 |
| 2020/0217118 A1* | 7/2020 | Wirth | | F16H 25/2454 |
| 2020/0263768 A1* | 8/2020 | Nanahara | | F16D 55/226 |
| 2020/0292039 A1* | 9/2020 | Matsuto | | H02K 7/06 |
| 2020/0300325 A1* | 9/2020 | Vine | | G05B 19/0426 |
| 2020/0300344 A1* | 9/2020 | Matsuto | | F16H 25/2454 |
| 2020/0313508 A1* | 10/2020 | Matsuto | | H02K 11/33 |
| 2020/0340564 A1* | 10/2020 | Luck | | B60T 13/746 |
| 2020/0378482 A1* | 12/2020 | Blesener | | F16H 25/20 |
| 2020/0378483 A1* | 12/2020 | Lin | | F16H 25/20 |
| 2020/0393028 A1* | 12/2020 | Mengel | | A61G 7/018 |

FOREIGN PATENT DOCUMENTS

| | | |
|---|---|---|
| DE | 102013108031 A1 | 11/2014 |
| EP | 0498111 A2 | 8/1992 |
| EP | 0577541 A1 | 1/1994 |
| EP | 0685662 A2 | 12/1995 |
| EP | 0763671 A2 | 8/1996 |
| EP | 0944788 B1 | 3/2003 |
| EP | 1592325 B1 | 9/2006 |
| WO | 1989010715 | 11/1989 |
| WO | 1996012123 A1 | 4/1996 |
| WO | 2003033946 A1 | 4/2003 |
| WO | 2006039931 A1 | 4/2006 |
| WO | 2007112745 A1 | 10/2007 |
| WO | 2011066836 A1 | 6/2011 |
| WO | 2016026495 A2 | 2/2016 |

* cited by examiner

LINEAR ACTUATOR

CROSS-REFERENCE TO RELATED APPLICATIONS

This application is a national stage filing based upon international application no. PCT/DK2019/000090, filed 8 Mar. 2019 (the '090 application), and published in English on 12 Sep. 2019 under international publication no. WO 2019/170203 A1, which claims priority to Denmark (DK) patent application no. PA 2018 00105, filed 8 Mar. 2018 (the '105 application). The '090 application and the '105 application are both hereby incorporated by reference as though fully set forth herein.

The invention relates to a linear actuator of the type described in the preamble of claim 1.

In hospital and care beds, the carrying surface is divided into a back-rest section and a leg-rest section as well as typically a fixed intermediate section. The back-rest and leg-rest sections are individually adjustable about a horizontal axis by means of a linear actuator each, cf. e.g. EP 0 498 111 A2 J. to Nesbit Evans & Company Ltd.

In certain situations, e.g. in case of cardiac arrest, it is crucial to be able to momentary lower the back-rest section from a raised position to a horizontal position. The speed of a linear actuator is simply too low to be able to perform the momentary lowering of the back-rest section to the horizontal position. To solve the problem, linear actuators with a so-called quick release have been developed, which disengages the spindle itself, which is of the non-self-locking type, from the motor or disengages a part of the transmission in driving connection with the spindle, where this part of the transmission and the spindle are non-self-locking. Examples of linear actuators of this type with quick release are e.g. known from EP 0 577 541 A1, EP 0 685 662 A2, WO 03/033946 A1 and WO 2006/039931 A1 all to LINAK A/S.

As mentioned, it is noted that the spindle of the linear actuator is non-self-locking, such that the load on the adjustment element of the linear actuator, which is connected to the spindle nut, sets the spindle into rotation. The spindle will accelerate under influence of the force from the load causing the adjustment element to rush towards the end position with increasing velocity and the back-rest section will in a collision-like manner brake abruptly when the back-rest section reaches its horizontal position. The acceleration towards the horizontal position is increased by the constructional structure of the bed, where the load on the linear actuator is smallest when the back-rest section assumes its maximum raised position, while the force impact is significantly increased the closer the section gets to its horizontal position, where the force impact is at its maximum. This collision-like braking can be very harmful to the patient, who is already traumatized, and furthermore it is a tremendous overload of the bed structure and the linear actuator. Since such a traumatic situation in itself is chaotic around the patient, this further poses a not insignificant risk of someone getting squeezed between the back-rest section and the upper frame in which the back-rest section is embedded, when this uncontrolled rushes downwards to a horizontal position. The problem is sought solved by incorporating a gas spring in the bed structure to dampen the movement, but this complicates and makes the structure more expensive. This is owing to the fact that the bed structure comprises extra brackets or the like to which the gas springs can be secured. In addition to this, it involves an increased mounting time and the costs for the gas springs. Furthermore, the bed will often be equipped with two gas springs to comply with existing standard requirements. Thus, intuitively, the solution does not appear to be the right solution to the problem.

This problem is previously acknowledged in EP 0 944 788 B1 to LINAK A/S, which discloses a linear actuator with a quick release and brake means for controlling the speed of the spindle when the spindle is disengaged from motor and transmission. The concrete embodiment shown in EP 0 944 788 B1 discloses a helical spring functioning as a brake spring, which tightens outwards against a fixed contact surface. By a controlled loosening of the engagement of the helical spring against the contact surface it is possible to control the velocity of the spindle. The construction is fine but requires adroitness of the operator in order to be able to control the speed evenly. Furthermore, the construction is complicated.

From WO2011/066836 A1 to LINAK A/S a construction is known, where this problem of controlling the speed manually is sought solved with a centrifugal brake, but this construction is likewise rather complicated, and the problem has not been fully satisfactorily solved.

EP 1 592 325 B1 to Dewert Antriebs- and Systemtechnik GmbH discloses a construction where the outer end of the tubular adjustment element of the actuator and a fork-shaped front mounting is equipped with a worm gear, which drives a cone-shaped element in connection with a fixed corresponding cone-shaped brake element. The cone-shaped brake element is spring-loaded in engagement with the cone-shaped element driven by the worm gear. By pulling the cone-shaped brake element more or less out of engagement with the cone-shaped element of the worm gear the lowering speed of the tubular adjustment element can be controlled.

It is noted that actuators without a tubular adjustment element are also known, where the spindle nut is constructed as an adjustment element and by means of which the actuator is secured in the structure in which it should be incorporated. An example of such an actuator is known from WO 96/12123 to Dietmar Koch. This type of actuator is usually used in arm chairs or recliners.

For beds for domestic use, a motor drive was developed in the late 1980s, where a linear actuator is built into each end of a joint housing. The motor drive is suspended on the rotary shafts for the back-rest and leg-rest section of the bed. These rotary shafts are equipped with an arm, which protrudes into the housing and loosely engages the spindle nut, which is constructed as a sliding element. These dual linear actuators have subsequently undergone a further development, such that they can also be used for care beds. Such a dual linear actuator is e.g. known from WO 89/10715 to Eckhart Dewert and DE 38 42 078 A1 to Niko Gesellschaft für Antriebstechnik GmbH as well as WO 2007/112745 A1 to LINAK A/S. An example of such a linear actuator with a quick release is disclosed in DE 296 12 493 U1 to Dewert Antriebs- and Systemtechnik GmbH Co KG.

WO2016/026495 discloses a linear actuator with a rotational damper of the fluid type comprising an internal body located in a liquid-filled hollow in an outer body, where one body is in driving connection with the spindle or the part of the transmission, which extends from the spindle to the quick release, and where a dampening effect, which dampens the speed of the spindle and thus the adjustment element, is generated when this body is rotated relative to the other body as a result of activation of the quick release. This construction makes it possible to provide a linear actuator having a self-controlling lowering speed when the quick release is activated as the dampening coefficient, torque/ angular velocity, is increased with increased angular velocity. A problem with the construction is that the rotational damper is active as soon as the quick release is activated and thus the lowering time becomes relatively long.

The purpose of the invention is to provide a solution for a controlled lowering or retraction of the spindle nut.

In this type of construction, the purpose of the invention is furthermore to provide a solution, where the lowering time when activating the quick release can be reduced.

The linear actuator according to the invention is characteristic in that there is a coupling between the brake means and the spindle in connection with the position means for determining the position of the spindle nut, and that the coupling engages or disengages the brake means for the spindle when the spindle nut is in a predetermined position on the spindle. Thus, the brake means is not permanently coupled to the spindle. This entails that the brake means can be engaged or disengaged when the spindle nut reaches a predetermined position on the spindle. If the brake means is engaged when the spindle nut passes a predetermined position on the spindle, the brake means will hereafter reduce the rotational speed of the spindle.

The linear actuator according to the invention is characteristic in that it comprises a quick release for disengaging the adjustment element from the reversible electric motor and the part of the transmission, which is located from the reversible electric motor to the quick release, such that the spindle is brought into rotation under the load on the spindle nut. Thus, the spindle nut moves at free speed until it reaches the predetermined position on the spindle where the brake means are engaged. Thus, an increased lowering speed is achieved while the dampening effect is maintained. Altogether, this will reduce the lowering time.

The linear actuator according to the invention is characteristic in that the position means is constructed as a thick-walled length of tube, which rotates about the same axis as the spindle. Thus, the position of the spindle nut can be determined.

The linear actuator according to the invention is characteristic in that the position means is in connection with the spindle through a gearing. Thus, the rotation of the position means can be increased or reduced relative to the rotation of the spindle.

The linear actuator according to the invention is characteristic in that one rotation or less of the position means corresponds to the length of stroke of the linear actuator. This makes it possible in a simple manner to determine the position of the spindle nut on the spindle. As the length of stroke corresponds to one rotation or less the same type of position means can be utilized for linear actuators having different length of stroke without changing the gearing. Thus, a cost reduction is achieved.

The linear actuator according to the invention is characteristic in that the coupling comprises a contact element in engagement with the position means and where a predetermined position of the contact element on the position means correlates to a predetermined position of the spindle nut on the spindle.

The linear actuator according to the invention is characteristic in that the position means comprises at least one track and where the contact element comprises a protrusion in engagement with (which can run in) the track.

The linear actuator according to the invention is characteristic in that the brake means can be displaced along the rotation and longitudinal axis of the spindle. Thus, only the brake means should be brought into direct or indirect engagement with the spindle.

The linear actuator according to the invention is characteristic in that it comprises a holder for the brake means and where the holder can be brought into direct or indirect engagement with the spindle. By having the holder engage the spindle directly or indirectly it is possible to achieve a better power transmission between the brake means and the spindle as one is not bound by the type and design of the brake means.

The linear actuator according to the invention is characteristic in that is comprises a rear mounting with a hollow in which the brake means, the position means and the coupling are wholly or partly arranged. By utilizing the space, which already is in the rear mounting, it is not necessary to increase the outer dimensions of the linear actuator.

A linear actuator according to the invention will be described more fully below with reference to the accompanying drawing, in which.

Figure 1:
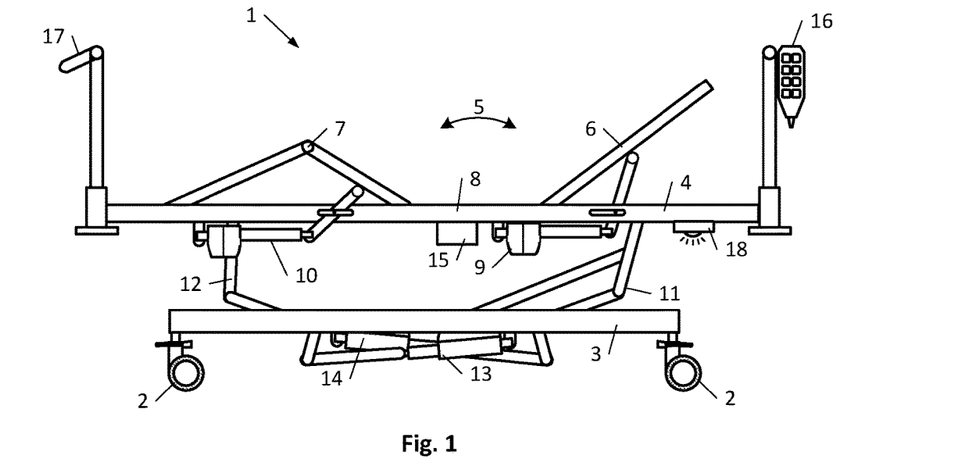
FIG. 1 shows an outline of a hospital bed.
Figure 2:
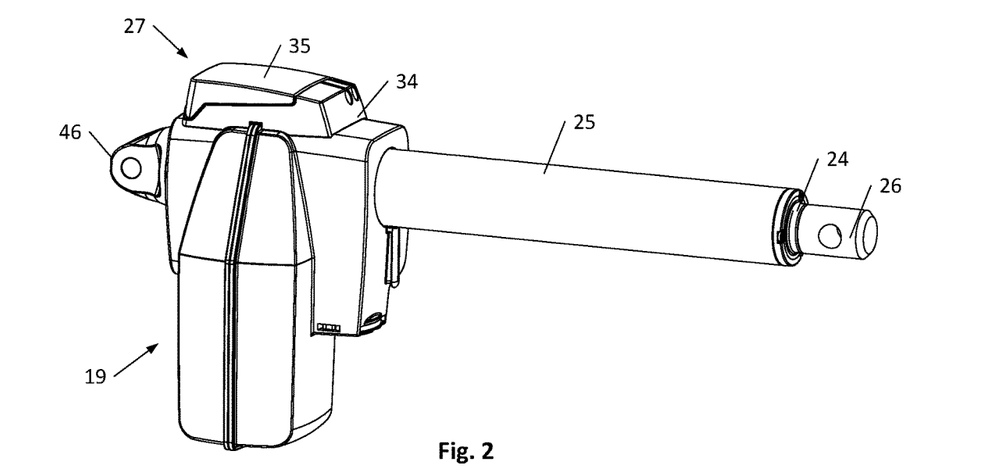
FIG. 2 shows a perspective view of a linear actuator with quick release and rotational damper.
Figure 3:
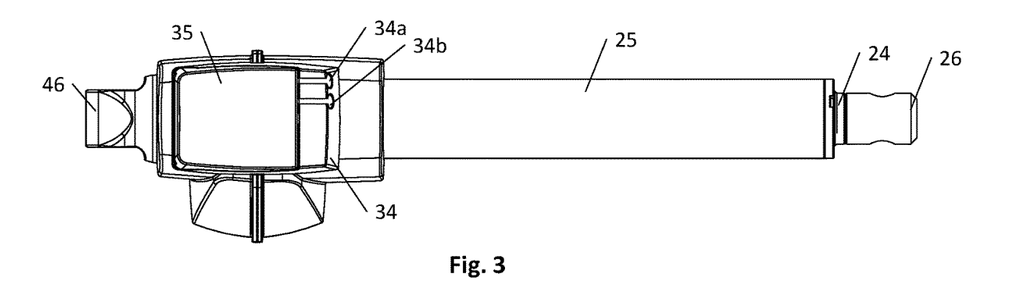
FIG. 3 shows a linear actuator with quick release and rotational damper seen from above.
Figure 4:
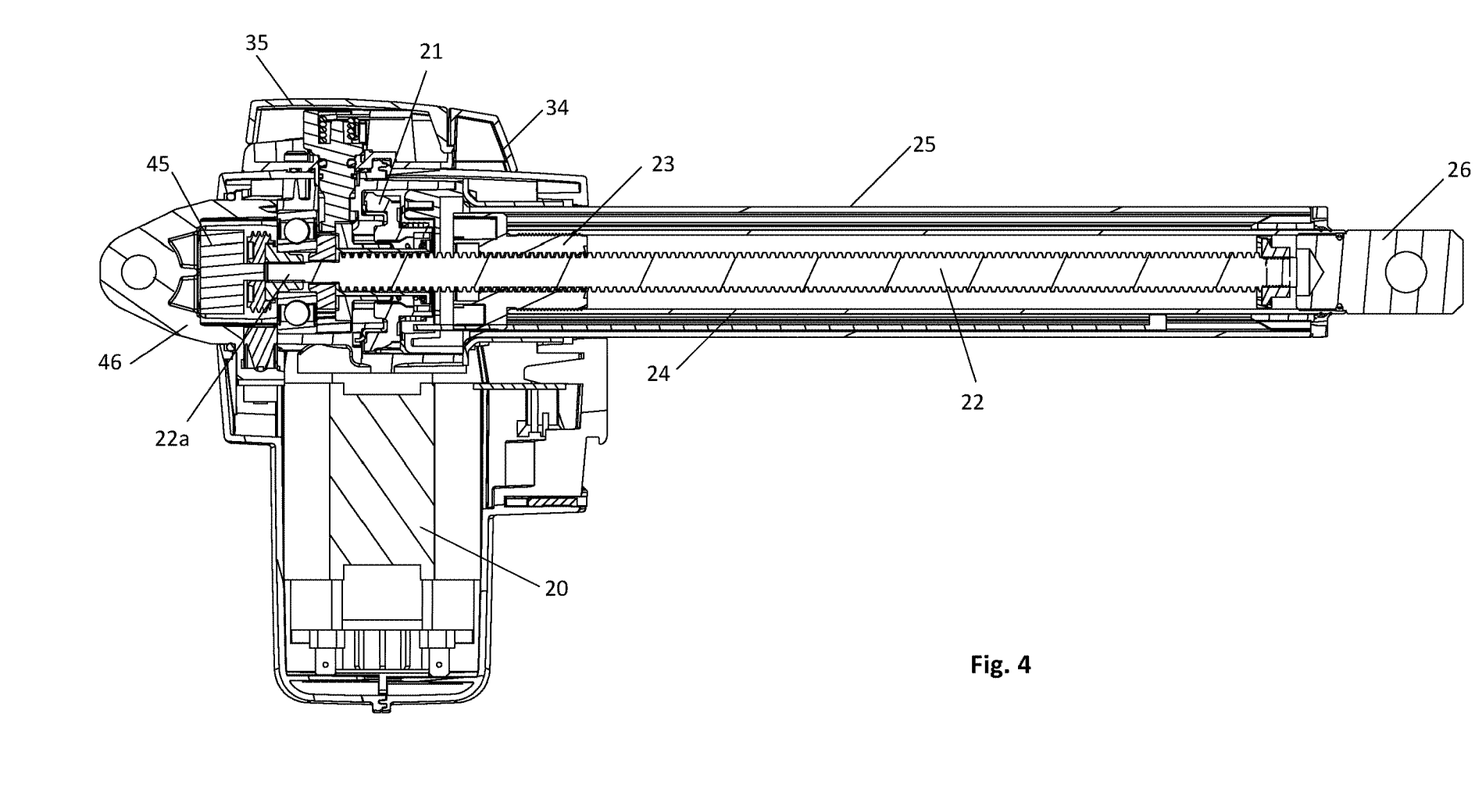
FIG. 4, shows a longitudinal section through the actuator as shown in FIG. 2.
Figure 5:
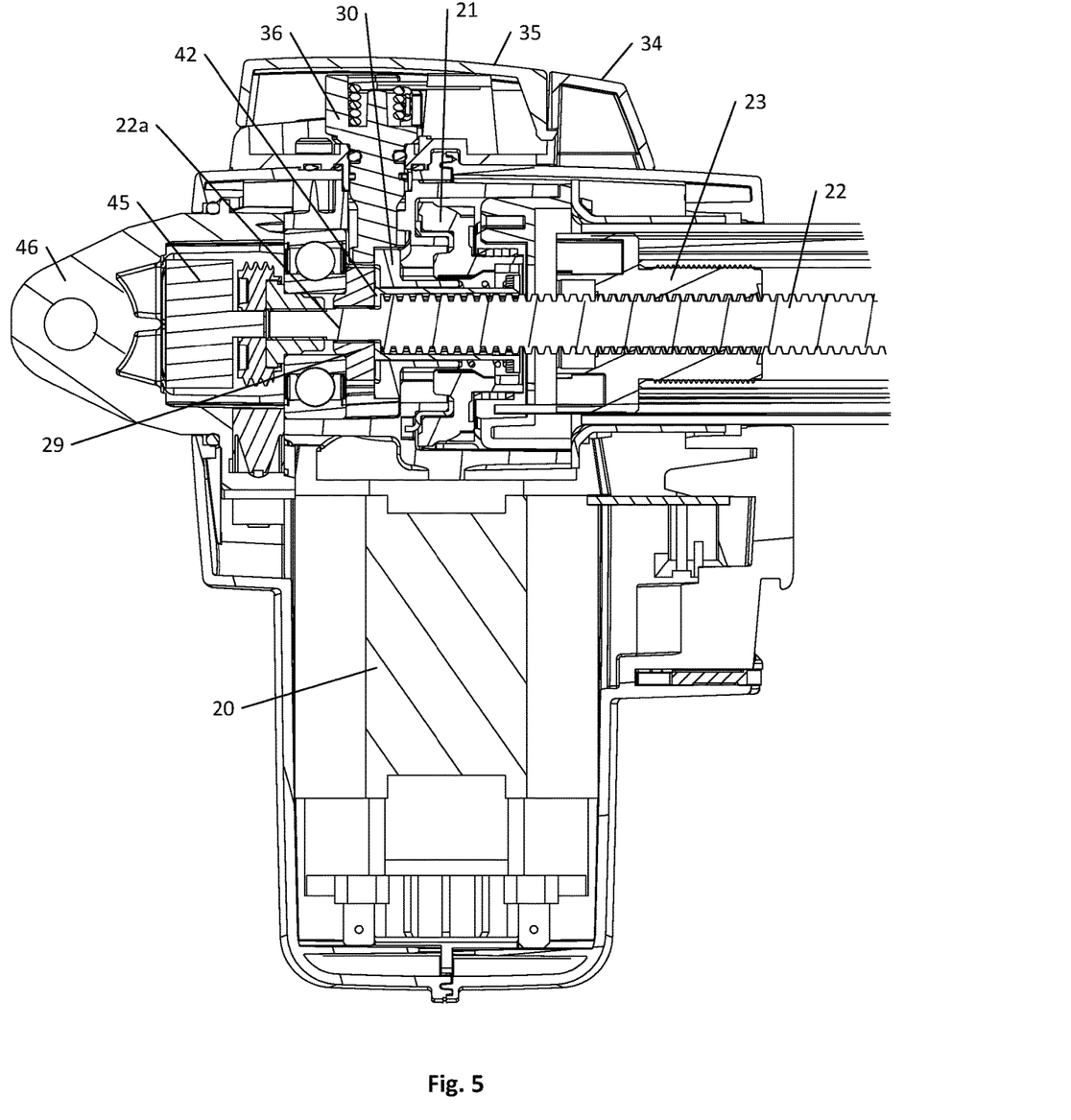
FIG. 5 shows a detailed section of the longitudinal section shown in FIG. 4.
Figure 6:
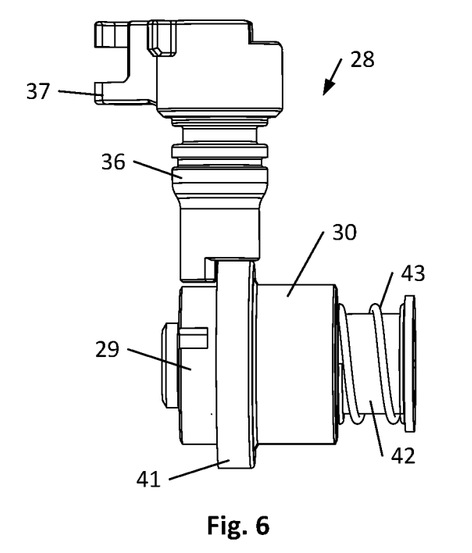
FIG. 6 shows parts of the quick release unit in its initial position seen from the side.
Figure 7:
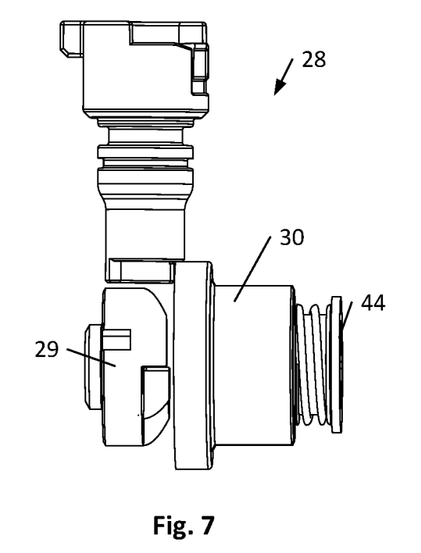
FIG. 7 shows parts of the quick release unit in a disengaged position seen from the side.
Figure 8A:
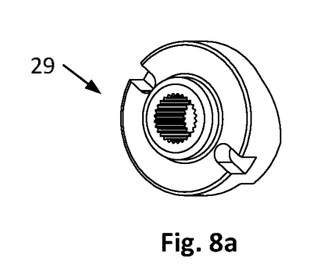
FIGS. 8a and 8b show the internal coupling part seen from each end, respectively.
Figure 8B:
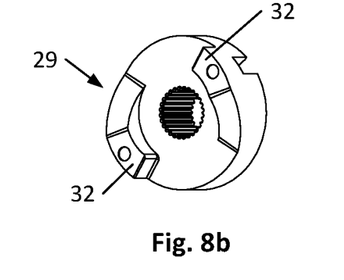
Figure 9A:
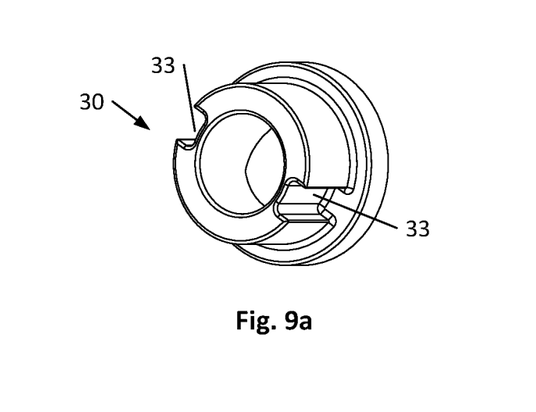
FIGS. 9a and 9b show the external coupling part seen from each end, respectively.
Figure 9B:
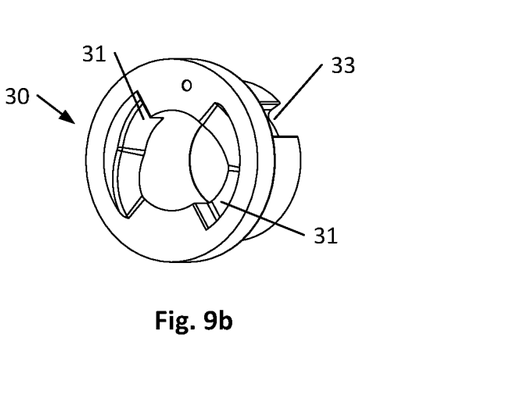
Figure 10:
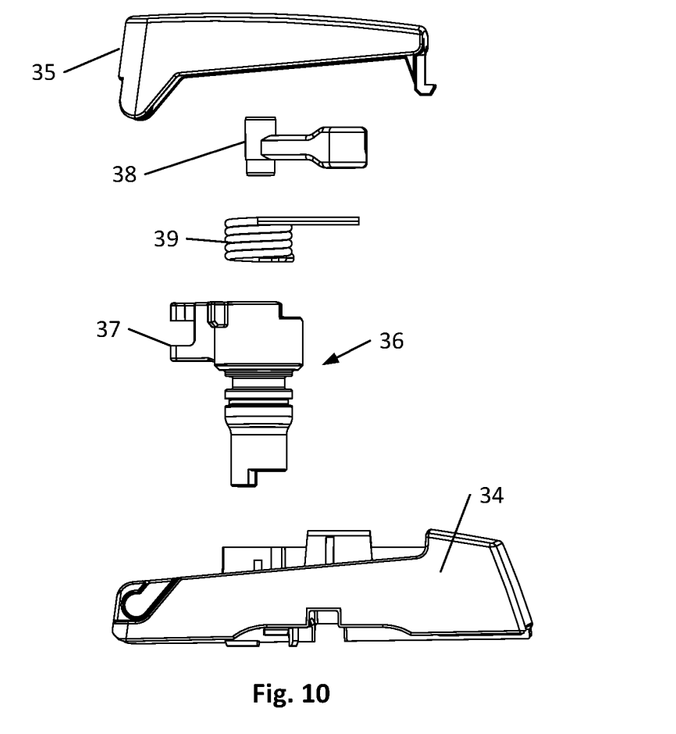
FIG. 10 shows an exploded view of the release mechanism.
Figure 11:
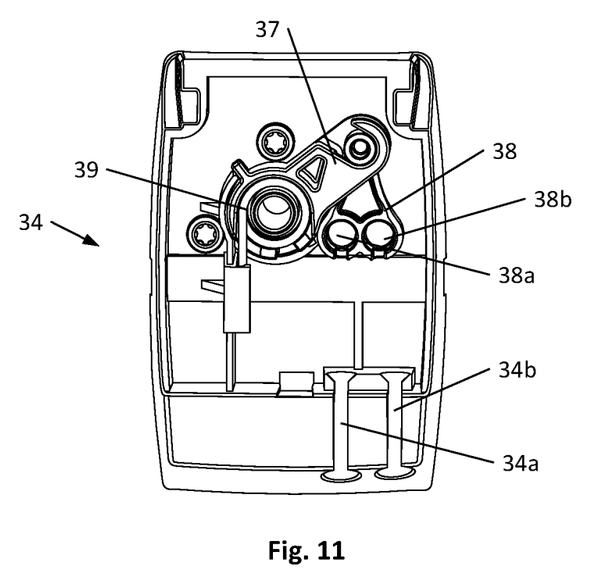
FIG. 11 shows the release mechanism seen from above and into the housing of the quick release unit.

The hospital bed 1 shown in FIG. 1 of the drawing comprises a lower frame 2 equipped with drive wheels 3 and an upper frame 4. An adjustable carrying surface for a mattress is mounted to the upper frame 4. The carrying surface comprises a back-rest section 6, an articulated leg-rest section 7 and a fixed middle section 8 between these. The back-rest and leg-rest sections 6,7 can be adjusted with a linear actuator 9,10 each, such that the carrying surface can assume various contours, indicated by the arrow 5. The upper frame 4 is connected to the lower frame 2 with a lever mechanism 11,12 at each end. The upper frame 4 can be raised and lowered by means of a pair of actuators 13,14 connected to the lever mechanism 11,12. The actuators 9,10;13,14 are connected to a control box 15 containing a power supply for connection to mains, a rechargeable battery pack as well as a controller. Operating units such as hand controls 16, fixed control panels in guard rails 17 as well as other peripheral equipment such as under bed light 18 are connected to the control box 15.

As it appears from FIGS. 2-11, the linear actuator 9, which moves the back-rest section 6, comprises a housing 19 with a reversible electric motor 20, which through a worm gear 21 drives a spindle 22 with a spindle nut 23, to which a tubular adjustment element 24, also called an inner tube, surrounded by an outer tube 25, is secured. A front mounting 26 is located at the end of the tubular adjustment element 24 for mounting of the linear actuator. The linear actuator in question is equipped with a quick release unit 27 with a release mechanism 28.

The quick release unit 27 comprises two coupling parts 29,30, where the internal coupling part 29 is mounted on a shaft end 22a of the spindle 22, while the external coupling part 30 has a hollow 31 (partially cylindrical track), in which the protrusion 32 on the inner coupling part 29 can be received in a torque transferring connection. The outer side of the external coupling part 30 further comprises a groove 33 for engagement with a corresponding tongue on the inner side of the through-going hole of the worm wheel 21, thus forming a torque transferring connection. Thus, the reversible rotation of the electric motor 20 is able to drive the spindle 22 through the worm gear (including the worm wheel 21) and further through the connection between the external and internal coupling part 29,30. The spindle nut 23, which is secured against rotation, can thus move back and forth on the spindle 22 depending on the rotational direction of the electric motor 20.

The quick release unit 27 further comprises a housing 34 with a cover 35 in which the release mechanism 28 is arranged. The housing 34 has two entrances 34a,34b for a not shown cable, which leads to a lever, not shown either. The release mechanism 28 comprises a tubular activation element 36, which is partially led through a hole in the bottom of the housing 34 and which thus extends partially into the housing 19 of the linear actuator. The upper end of the activation element 36, which is located in the housing 34, comprises an arm 37 extending in a radial direction from the rotational and central shaft of the activation element 36 (see FIGS. 6 and 11). The arm 37 of the activation element is connected to a cable holder 38 which comprises two holes 38a, 38b in which a cable, e.g. in the form of a wire, can be secured. Each of the cables can run in the two entrances 34a, 34b, respectively in the housing 34. The upper end of the activation element 36 comprises a hole in which a return spring 39 is arranged. A free end of the winding of the return spring is fixed in a track in the housing 34. Under reference to FIGS. 6, 7 and 11, the activation element 36 will be rotated in a clockwise direction when a cable is pulled via the arm 37. Concurrently with the pull force in the cable being reduced, the return spring 39 will cause the activation element 36 to be rotated in a counterclockwise direction into an initial position.

The lower end of the tubular activation element 36 is partially shortened with an indentation having a first plane surface perpendicular to the rotational and central axis of the activation element and a second plane surface 40 parallel to the rotational and central axis of the activation element. Seen from the end of the lower end of the activation element 36, the second plane surface 40 forms a chord in the circular section of the activation element.

When the activation element 36 is in its initial position, the second plane surface 40 rests against a collar 41 on the external coupling part 30. In this initial position, the external coupling part 30 is in engagement with the internal coupling part 29. This torque transferring connection between the two coupling parts 29, 30 is procured by spring-loading the external coupling part 30. Thus, the external coupling part 30 is displaceably arranged on a bushing 42, which further comprises a compression spring 43 located between an end wall 44 of the bushing 42 and the external coupling part 30. In this embodiment, the bushing 42 is positioned over the thread of the spindle 22 in continuation of the shaft end 22a of the spindle, such that the end wall 44 is positioned furthest away from the shaft end 22a of the spindle.

When the activation element 36 is rotated as a result of a cable being pulled, the second plane surface 40 will displace the external coupling part 30 in the direction towards the end wall 44 of the bushing and thus compress the compression spring 43. After a predetermined rotation of the activation element 36, the external coupling part 30 will be displaced so much that the torque transferring connection is interrupted.

Thus, the spindle 22 can rotate freely independent of the transmission 21 and electric motor 20. The spindle 22, spindle nut 23 and the tubular adjustment element 24 of the actuator, will thus be disengaged and the back-rest section 6 of the bed will thus under its load move into its horizontal position.

A rotational damper 45 of the fluid type is connected to the free end of the shaft end 22a of the spindle, which is embedded by means of a bearing in the housing 19. The rotational damper 45 is mounted in a hollow in a rear mounting 46 on the rear end of the linear actuator. The rotational damper 45 comprises an inner body in the form of a cylinder placed in a liquid-filled hollow in an outer body, which is also constituted by a cylinder. The liquid used in the hollow of the rotational damper 45 is a silicone oil. The inner body is through a shaft end in driving connection with the shaft end 22a of the spindle. When the quick release unit 27 via the release mechanism 28 is activated and the spindle thus is disengaged, this will put the inner body into rotation relative to the outer body. Thus, a dampening effect is generated, which dampens the speed of the spindle and thus the adjustment element. Based on the maximum load on the actuator, the maximum dampening with which the rotational damper is allowed to dampen the speed of the tubular adjustment element 24 can be determined and a maximum lowering speed can thus be determined. The dampening can be determined based on choice of liquid and its viscosity as well as the design and the size of the inner and outer bodies. An example of a rotational damper is disclosed in EP 0 763 671 A2 to Illinois Tool Works Inc.

The rotational damper has a built-in free-wheeling bearing such that the rotational damper is disengaged during normal operation of the actuator and thus does not interfere with this or requires extra energy.

Figure 12:
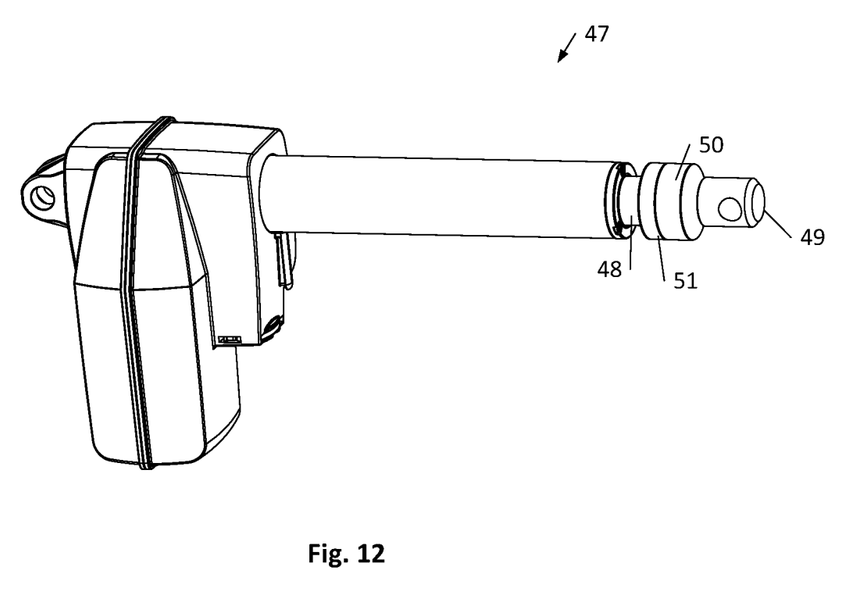
FIG. 12 shows a schematic construction of a linear actuator.

FIG. 12 of the drawing schematically shows a linear actuator 47 according to the invention, which consists of a reversible electric motor, a transmission, a spindle with a spindle nut and a tubular adjustment element (inner tube) 48. A front mounting 49 for securing the actuator 47 is located at the outer end of the tubular adjustment element. A quick release 50 connected to a rotational damper 51 of the fluid type is located between the front mounting 49 and the tubular adjustment element 48. During normal operation of the actuator 47 the front mounting will be fixed relative to the tubular adjustment element 48. When activation the quick release 49, the tubular adjustment element 48 is disengaged from the front mounting 49, by which the tubular adjustment element 48, e.g. via a bearing connection (not shown), can rotate freely relative to the front mounting 49. A compressive load on the front mounting 49 will thus be transferred to the tubular adjustment element 48 and cause this to rotate in the inwards direction. It is noted that the spindle of the actuator is fixed during the rotation of the tubular adjustment element 48. The rotational damper 51 generates a dampening effect, which dampens the rotation and thus the speed by which the tubular adjustment element 48 is moved in the inwards direction.

Figure 13:
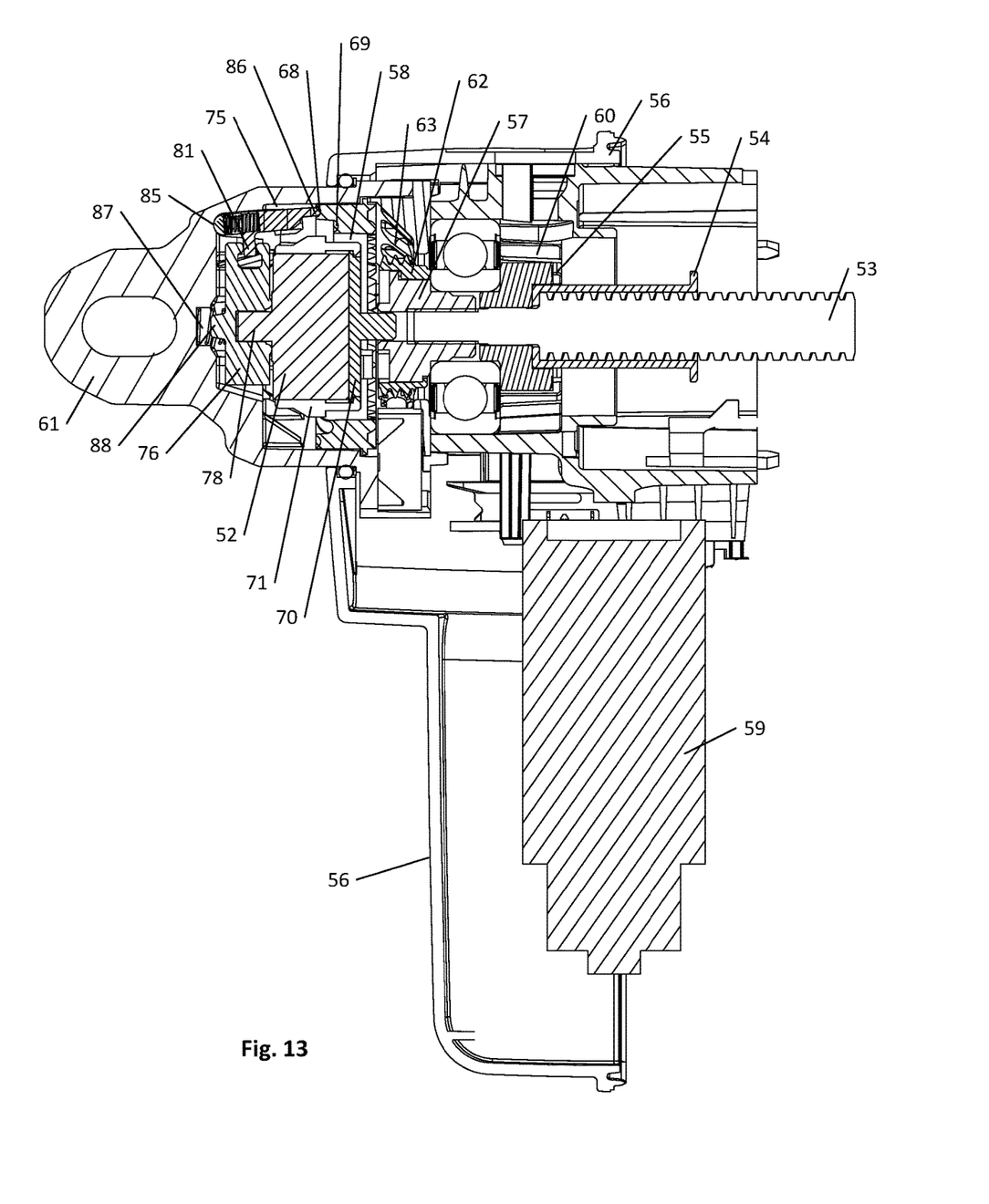
FIG. 13 shows a longitudinal section through the linear actuator in another embodiment, where the brake means a disengaged from the spindle.
Figure 14:
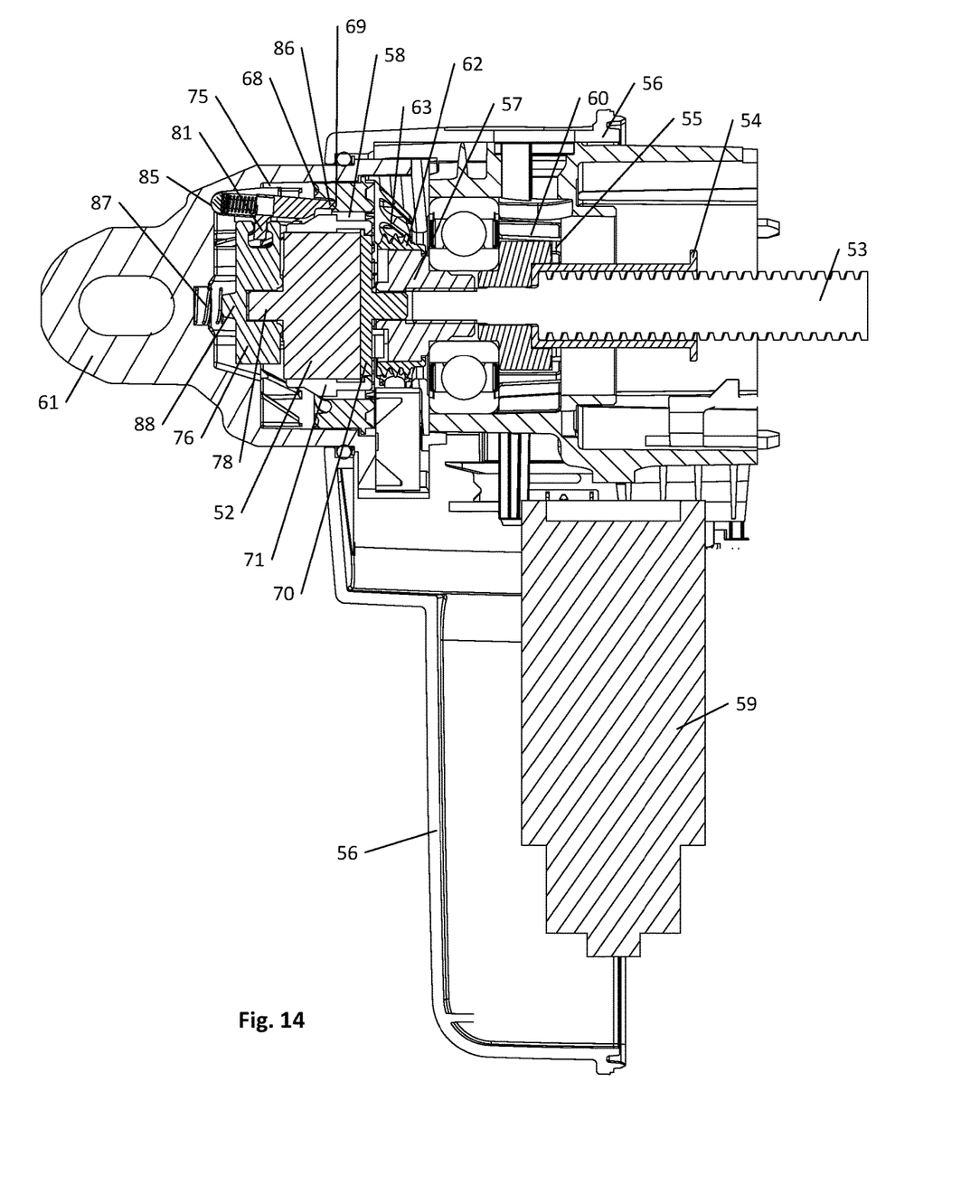
FIG. 14 shows a longitudinal section through the linear actuator in another embodiment, where the brake means is engaged with the spindle.
Figure 15:
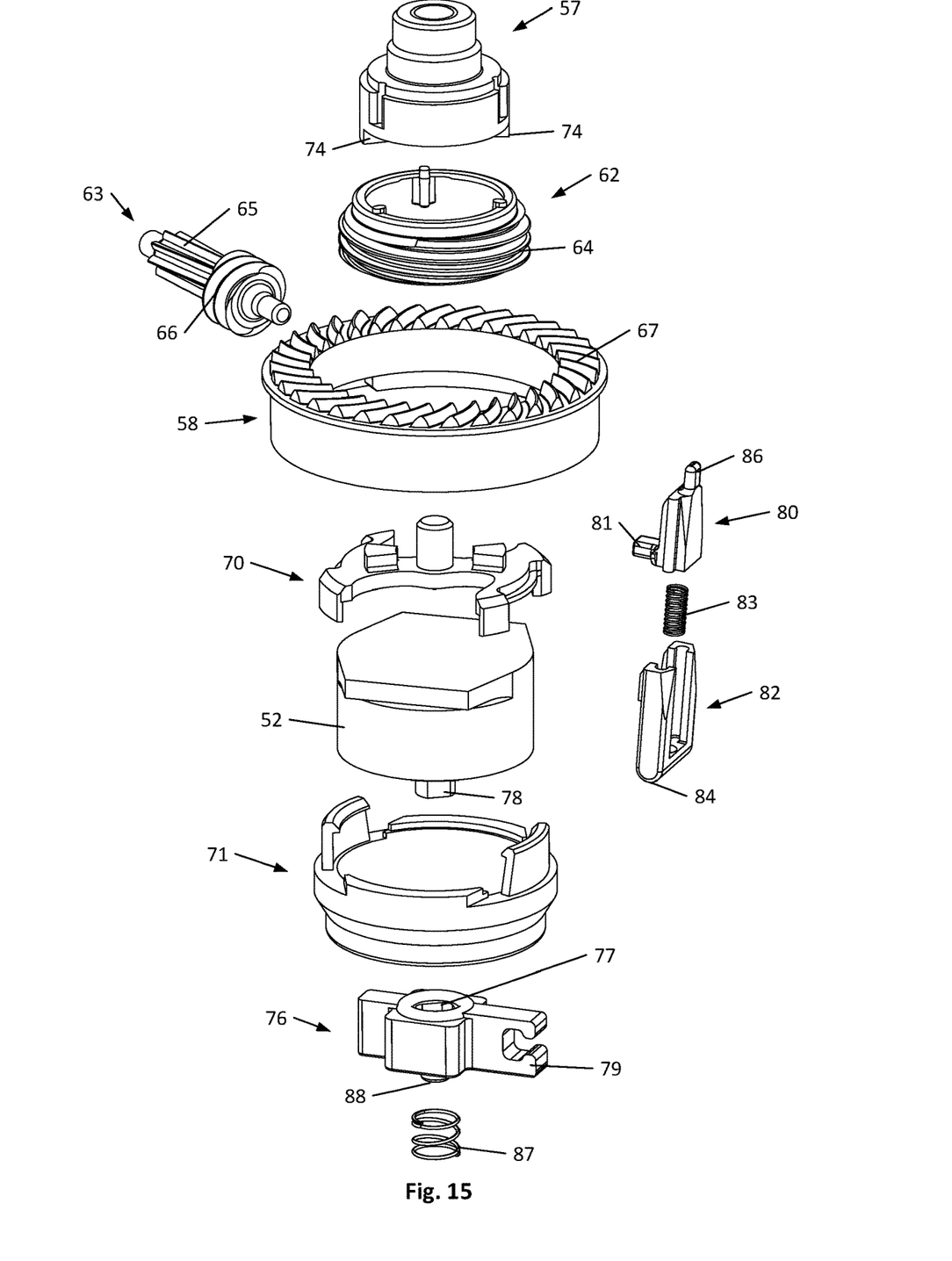
FIG. 15 shows an exploded perspective view of an end spindle nut, a position means, a brake means and a coupling.

FIGS. 13-15 show a different embodiment of the linear actuator with a brake means 52, e.g. a rotational damper of the fluid type, which is not permanently connected to the spindle 53. For simplification of this embodiment, the linear actuator is not shown in full. Thus, only the bushing 54 and one of the coupling parts 55 for the quick release unit are shown. The spindle 53 is shown shortened. A number of components are not shown, including the adjustment element, the outer tube and part of the housing 56. FIGS. 13 and 14 shows a longitudinal section through the linear actuator and FIG. shows the end spindle nut 57, the position means 58, the brake means 52 and the coupling XX in an exploded perspective. Although the linear actuator here is equipped with a quick release unit, it is noted that it can be without quick release unit. The mode of operation of the linear actuator including the quick release unit is as described above.

The linear actuator comprises a housing 56 with a reversible electric motor 59, which through a worm gear 60 drives a spindle 53 with a spindle nut to which an adjustment element, also called an inner tube, surrounded by an outer tube is secured. At the end of the tubular adjustment element a front mounting for mounting of the linear actuator is located.

The reversible rotation of the electric motor 59 can through the worm gear 60 and further through the connection between the outer and inner coupling part 55 drive the spindle 53. The spindle nut 53, which is secured against rotation, can thus move back and forth on the spindle 53 depending on the direction of rotation of the electric motor 59.

The linear actuator comprises a brake means 52 and a corresponding position means 58 and coupling XX. All components are in this embodiment mounted in a hollow in a rear mounting 61 at the rear end of the linear actuator. Thus, the end of the spindle is connected to a spindle end nut 57 which follows the rotation of the spindle 53. The spindle end nut 57 is further connected to a spindle toothed wheel 62, which through an intermediate shaft 63 drives a position means 59. The spindle toothed wheel 62 is constructed as a short length of tube with external thread 64, which extends along the longitudinal and rotational shaft of the spindle. The intermediate shaft 63 has a rotational shaft perpendicular to the longitudinal and rotational shaft of the spindle and is in two parts, the toothed wheel part 65 and a threaded part 66, respectively. The toothed wheel part 65 and the threaded part 66 have the same rotational axis. The toothed wheel part 65 is in engagement with the thread 64 of the spindle tooth wheel and the threaded part is in engagement with a toothed rim 67 on the position means 58. The position means 58 is constructed as a thick-walled length of tube, which rotates about the same axis as the spindle 53. The toothed rim 67 on the position means 58 is located on the top of the length of tube such that it extends in one direction opposite the rear mounting 61. The threaded part 66 on the intermediate shaft 63 and the toothed rim 67 on the position means 58 are of the gear type face gear. The entire gearing 62,63 from the spindle 53 to the position means 58 ensures that one rotation or less of the position means 58 corresponds to the length of stroke of the linear actuator. The latter is the maximum distance which the spindle nut can travel on the spindle.

Opposite the toothed rim 67 of the position means, i.e. at the bottom of the thick-walled length of tube, a track 68,69 is constructed in the wall portion. The depth of the track measured relative to the bottom of the position means varies. In this embodiment, there are overall two tracks, an inner track 68 and an outer track 69, which are closest to and furthest away, respectively, from the axis of rotation of the position means. A connecting track or ramps connect the inner track 68 and the outer track 69.

In this embodiment, the brake means 52 comprises a rotational damper of the fluid type, which is located in a holder 70,71 in which the rotational damper is secured against rotation. The holder comprises a top part 70 and a bottom part 71, which partially encases the rotational damper. It is noted that the holder 70,71 and thus the encased rotational damper can rotate freely about the longitudinal and rotation axis. Furthermore, the holder 70,71 and the encased rotational damper can be displaced in a direction along the longitudinal and rotation axis of the spindle. The upper surface 72 of the top part 70 comprises two protrusions 73 which, when the holder 70,71 and the encased rotational damper is displaced in a direction opposite the rear mounting 61, is prepared for engagement with corresponding protrusions 74 at the bottom of the spindle nut 57.

The holder 70,71 and the encased rotational damper is displaced back and forth in the hollow 75 of the rear mounting via a coupling XX, which is connected to the position means 58. The coupling XX comprises a shaft extension 76 which in a hollow 77 retains the shaft end 78 of the rotational damper against rotation. At one end, the shaft extension 76 comprises a hook 79. The hook 79 retains a pin 81 on the side of a contact element 80. The contact element 80 is displaceably located in a holder 82 for the contact element 80 and is spring-loaded 83. The bottom 84 of the holder 82 for the contact element rests in one side of the bottom 85 of the hollow 75 of the rear mounting in such a manner that the holder 82 can tilt about the point where the holder rests 85. The contact element 80 comprises a protrusion 86 constructed in such a manner that it can migrate/run in the track 68,69 of the position means. A spring 87 is arranged between the bottom 85 in the hollow 75 of the rear mounting and a protrusion 88 on the shaft extension 76, such that the shaft extension 76 and the brake means 52 with holder 70, 71 are spring loaded.

Figure 16:
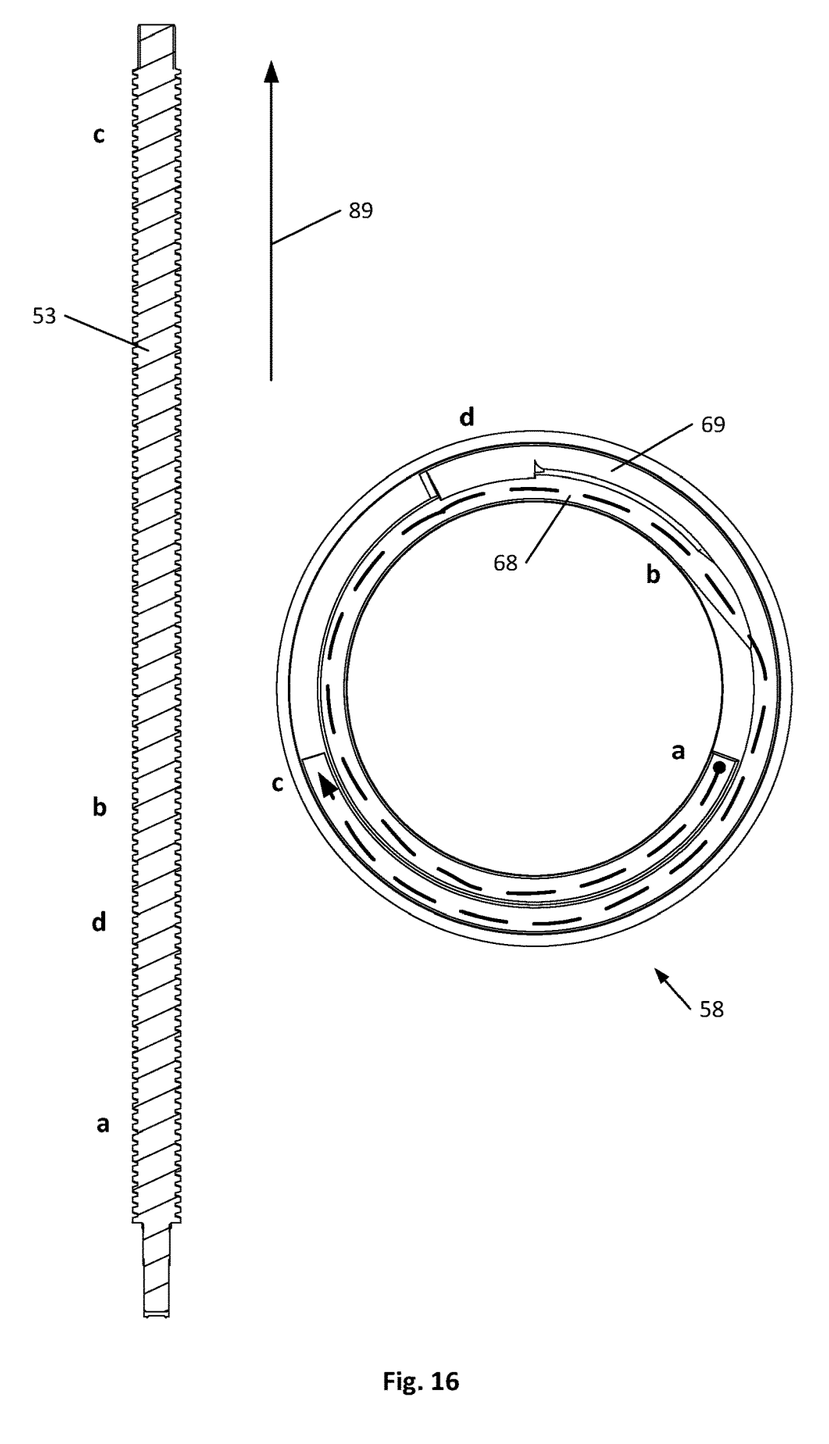
FIG. 16 shows the position means seen from the bottom and a spindle, where a not shown spindle nut is thought moved in an outwards direction.
Figure 17:
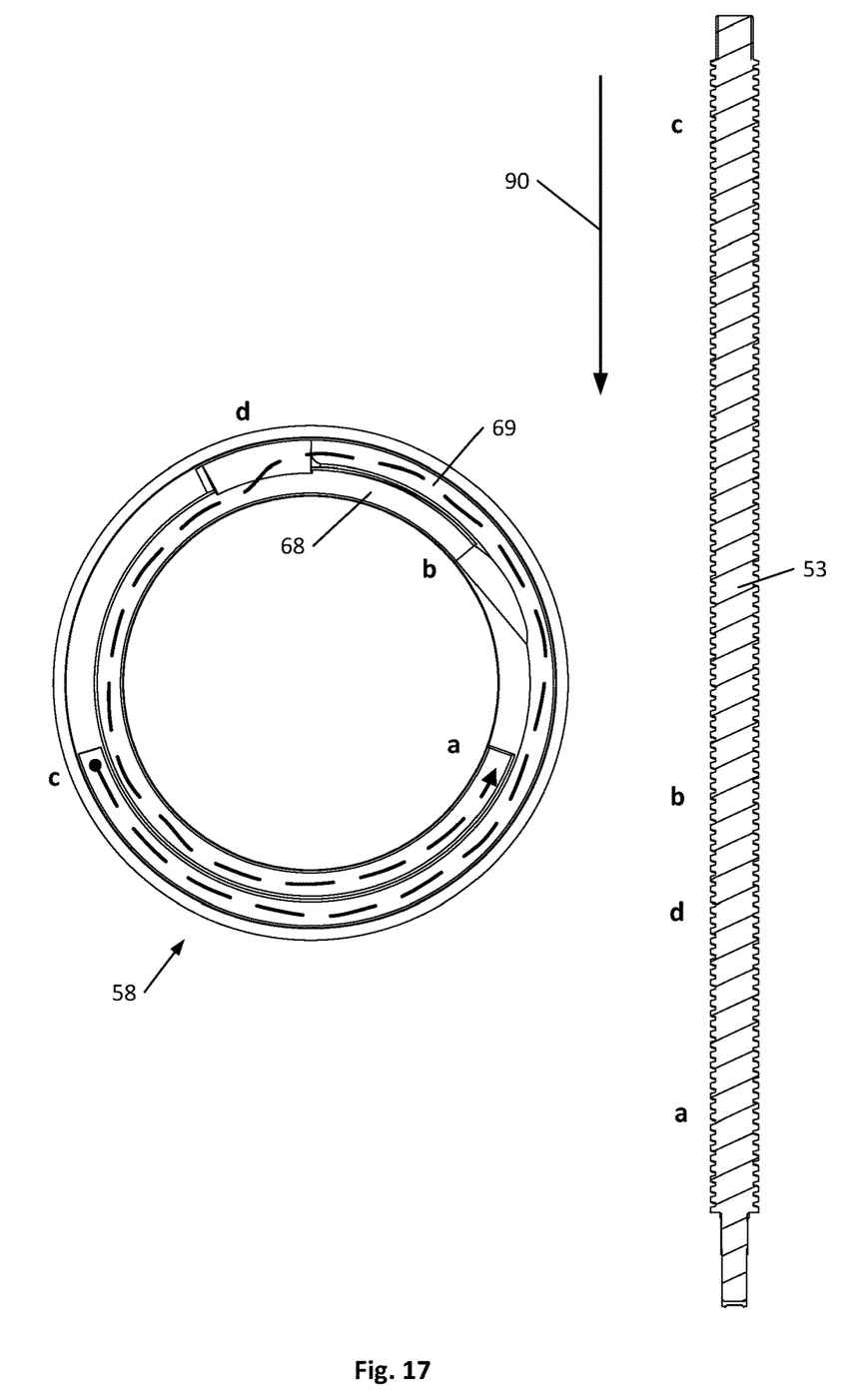
FIG. 17 shows the position means seen from the bottom and a spindle, where a not shown spindle nut is thought moved in an inwards direction.

The position which the protrusion 86 of the contact element 80 has in the track 68,69 in the position means 58 determines whether the brake means 52 is engaged with or disengaged from the spindle 53. FIGS. 16 and 17 show how the length of stroke of the linear actuator, i.e. the distance which the spindle nut can move on the spindle 53 correlates to the track 68,69 in the position means 58. Thus, a given position of the spindle nut corresponds to a point on the track 68,69 in in position means 58. The position in the track 68,69 is furthermore dependent on the direction of rotation of the spindle, i.e. whether the spindle 53 rotates such that the spindle nut travels in the outwards or inwards direction 89,90.

As mentioned, the depth of the track 68,69 measured relative to the bottom of the position means varies. In this embodiment, there are overall two tracks, an inner track 68 and an outer track 69, which are closest to and furthest away, respectively, from the axis of rotation of the position means. A connecting track or ramps connect the inner track 68 and the outer track 69. FIGS. 16 and 17 show the position means seen from the bottom. Four positions a,b,c,d on the spindle 53 and the position means 58, respectively, are indicated for explanation of the mode of operation of the coupling XX. In this embodiment, the coupling XX is, together with the position means 58, adapted to engage the brake means 52, here a rotational damper of the fluid type, on the lowermost distance of the threaded portion of the spindle.

In the following, FIG. 16 is used for describing a scenario where the spindle nut 53 is in its innermost end position a, i.e. closest to the rear mounting 61, and moves towards the outermost end position c, i.e. closest to the front mounting. In position a, the brake means 52 is engaged, but due to the relatively low rotational speed of the spindle 53 it does not contribute to a noticeable brake effect. The protrusion 86 of the contact element is likewise at a position in the inner track 68 of the position means 58. When the spindle nut 53 and the protrusion 86 of the contact element passes position d, the brake means 52 will still be engaged. When the protrusion 86 of the contact element reaches position b, this will via a ramp move from the inner track 68 to the outer track 69. Thus, the contact element 80 is pushed into its holder 82 by deforming the spring 83 in the holder 82. The pin 81 on the contact element 80 is likewise moved in a direction towards the rear mounting 61, by which the shaft extension 76 and thus the brake means 52 and its holder 70,71 are moved in the same direction. The protrusions 73 on the upper surface 72 of the top part are thus brought out of engagement with the spindle nut 57. Thus, the brake means 52 is now disengaged from the spindle 53. When the spindle nut and the protrusion 86 of the contact element reach position c, these are in their outermost end position.

In the following, FIG. 17 is used for describing a scenario where the spindle nut is in its outermost end position c, i.e. closest to the front mounting, and moves towards the innermost end position a, i.e. closest to the rear mounting 61. In position c, the brake means 52 is disengaged. The protrusion 86 of the contact element is in a corresponding position in the outermost track 69 in the position means 58. When the spindle nut and the protrusion 86 passes position b, the brake means 52 will still be disengaged. When the protrusion 86 of the contact element reaches position d, this will via a ramp move from the outer track 69 to the inner track 68. Thus, the contact element 80 is moved in a direction out of its holder 82 in that the potential energy in the spring 83 of the holder is partially released. The pin 81 on the contact element 80 is likewise moved in a direction towards the front mounting, by which the shaft extension 76 and thus the brake means 52 and its holder 70,71 is moved in the same direction. The protrusions 73 on the upper surface 72 of the top part are thus brought into engagement with the spindle nut 57. Thus, the brake means 52 is now coupled to the spindle 53. When the spindle nut and the protrusion 86 of the contact element reach position a, these are in their innermost end position.

Figure 18:
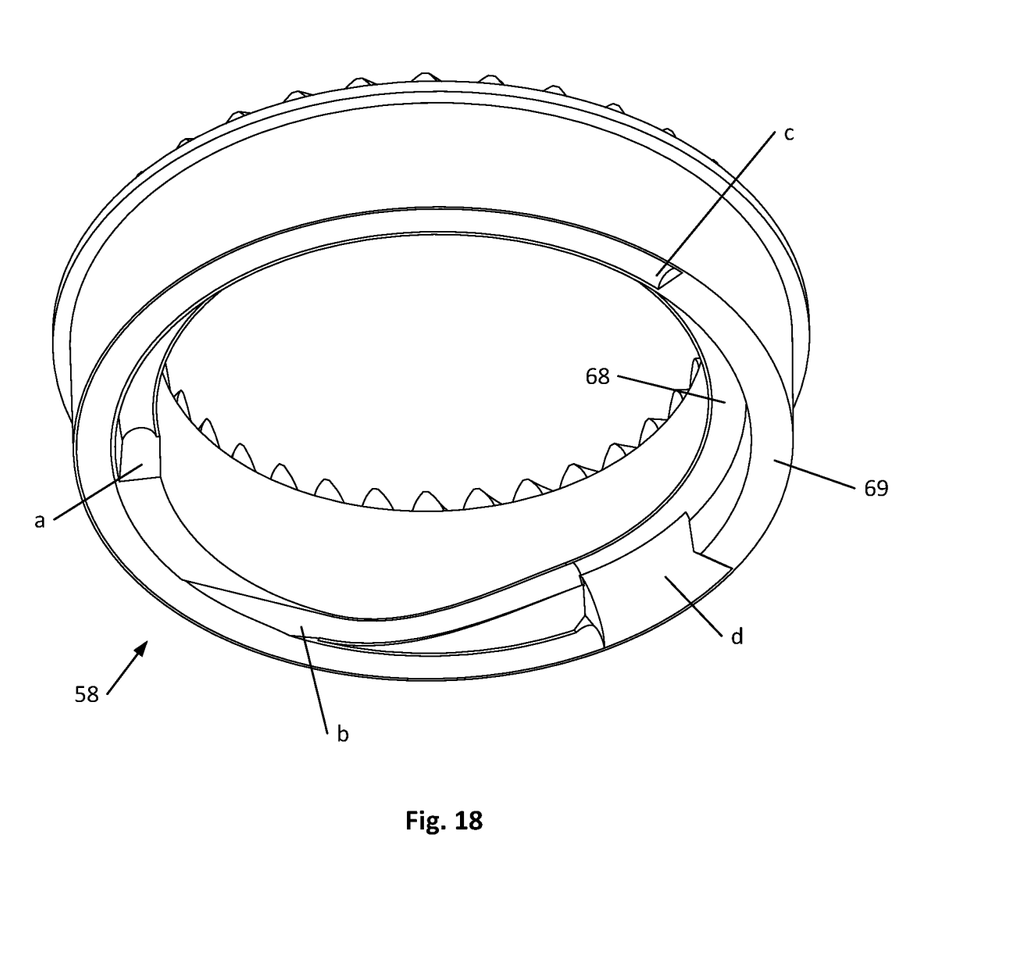
FIG. 18 shows a perspective view of the position means seen from the bottom.

FIG. 18 shows a perspective view of the position means seen from the bottom. The positions a,b,c,d as well as the inner track 68 and the outer track 69 is indicated here.

FIG. 13 shows the brake means 52 disengaged from the spindle 53. Thus, the spindle nut will here be between the positions c and b on the spindle 53 and the protrusion 86 of the contact element in a correlated position between c and b in the outer 69 on the position means.

FIG. 14 shows the brake means 52 engaged with the spindle 53. Here, the spindle nut will be between the positions d and a or a and b depending on the direction of rotation of the spindle. Correspondingly, the protrusions 86 of the contact element will be in a correlated position in the inner track 68 in the position means 58 either between d and a or a and b.

The invention claimed is:

1. A linear actuator comprising:
   a reversible electric motor (20),
   a transmission (21),
   a non-self-locking spindle (22), where the reversible electric motor (20) through the transmission (21) drives the non-self-locking spindle (22),
   a spindle nut (23) on the spindle (22)
   an adjustment element (24) secured against rotation and where the adjustment element can be moved axially as it is connected to or integrated with the spindle nut (23) on the spindle (22),
   position means for determining the position of the spindle nut (23),
   brake means for controlling the velocity of the spindle nut (23) under the external load,
   wherein between the brake means and the spindle there is a coupling in connection with the position means for determining the position of the spindle nut (23) and that the coupling engages the brake means to the spindle or disengages the brake means from the spindle, when the spindle nut (23) is in a predetermined position on the spindle (22).

2. The linear actuator according to claim 1 wherein the linear actuator comprises a quick release (27) for disengagement of the adjustment element (24) from the reversible electric motor (20) and the part of the transmission (21), which is located from the reversible electric motor (20) to the quick release (27), such that the spindle (22) is brought into rotation under the load on the spindle nut (23).

3. The linear actuator according to claim 1 wherein the position means is in connection with the spindle through a gearing.

4. The linear actuator according to claim 1 wherein the position means is constructed as a thick-walled length of tube, which rotates about the same axis as the spindle.

5. The linear actuator according to claim 1 wherein one rotation or less of the position means corresponds to the length of stroke of the linear actuator.

6. The linear actuator according to claim 5 wherein the coupling comprises a contact element in engagement with the position means and where a predetermined positon of the contact element on the position means correlates to a predetermined position of the spindle nut on the spindle.

7. The linear actuator according to claim 6 wherein the position means comprises at least one track and where the contact element comprises a protrusion in engagement with the track.

8. The linear actuator according to claim 1 wherein the brake means can be displaced along the rotation and longitudinal axis of the spindle.

9. The linear actuator according to claim 1 wherein it comprises a holder for the brake means and where the holder can be brought into direct or indirect engagement with the spindle.

10. The linear actuator according to claim 1 wherein it comprises a rear mounting with a hollow in which the brake means, the position means and the coupling are wholly or partly arranged.

* * * * *